(12) United States Patent
Goyal et al.

(10) Patent No.: US 12,271,723 B2
(45) Date of Patent: Apr. 8, 2025

(54) MANAGING INSTALLATION AND UPDATES OF AN APPLICATION ON A COMPUTING DEVICE

(71) Applicant: Google LLC, Mountain View, CA (US)

(72) Inventors: Anuj Goyal, Mountain View, CA (US); Benjamin Ackerman, San Francisco, CA (US); Marcus Köhler, Munich (DE); Apisada Petchtes, Newcastle, WA (US); Qingle Yao, Bellevue, WA (US); Dan Chen, Bellevue, WA (US); Ligeng Dong, Bellevue, WA (US); David Shangni Li, Emeryville, CA (US); Oleg Davydov, Munich (DE)

(73) Assignee: Google LLC, Mountain View, CA (US)

( * ) Notice: Subject to any disclaimer, the term of this patent is extended or adjusted under 35 U.S.C. 154(b) by 155 days.

(21) Appl. No.: 17/932,344

(22) Filed: Sep. 15, 2022

(65) Prior Publication Data
US 2024/0095007 A1    Mar. 21, 2024

(51) Int. Cl.
*G06F 8/65*    (2018.01)
*G06F 8/61*    (2018.01)

(52) U.S. Cl.
CPC . *G06F 8/65* (2013.01); *G06F 8/61* (2013.01)

(58) Field of Classification Search
CPC .................................... G06F 8/65; G06F 8/61
See application file for complete search history.

(56) References Cited

U.S. PATENT DOCUMENTS

| | | | |
|---|---|---|---|
| 2009/0222811 A1* | 9/2009 | Faus | G06F 8/65 717/173 |
| 2016/0019043 A1* | 1/2016 | Ramasamy | G06F 8/65 717/171 |
| 2017/0068531 A1* | 3/2017 | Ech-Chergui | G06F 8/65 |
| 2017/0250977 A1* | 8/2017 | Turner | H04L 67/34 |
| 2019/0230130 A1* | 7/2019 | Beckman | H04L 9/40 |
| 2020/0228400 A1* | 7/2020 | Stillman | H04L 41/082 |
| 2020/0371766 A1* | 11/2020 | Sousa | H04L 63/083 |
| 2021/0099868 A1* | 4/2021 | Damlaj | H04L 67/146 |
| 2021/0136329 A1* | 5/2021 | Wang | G06V 20/52 |
| 2022/0382573 A1* | 12/2022 | Liu | G06N 20/00 |
| 2023/0116566 A1* | 4/2023 | Kim | H04W 12/03 726/17 |

* cited by examiner

*Primary Examiner* — Wei Y Zhen
*Assistant Examiner* — Amir Soltanzadeh
(74) *Attorney, Agent, or Firm* — Brake Hughes Bellermann LLP

(57) ABSTRACT

This disclosure relates to a method for managing installation of applications, where the method includes receiving, from a first computing device associated with an administrator of an organization, a pin request to attach an application, provided by an application store platform, with a version of the application, initiating, in response to the pin request, transfer of a copy of the version of the application from the application store platform to a data storage device, generating an application identifier that identifies a location of the version of the application stored in the data storage device, and transmitting installation data to a second computing device that is managed by the organization. The installation data includes the application identifier, which is used by the second computing device to install the version of the application from the data storage device.

20 Claims, 10 Drawing Sheets

537

USERS & BROWSERS    KIOSKS    MANAGED GUEST SESSIONS    PINNED APPS & EXTENSIONS 590

| Name 592 | Platforms 594 | Version 511 |
|---|---|---|
| App1 | ⊕ | 1.5.2. (April 2020) |
| App2 | ⊕ | 1.5.2. (April 2020) |
| App3 | ⊕ | 1.5.2. (April 2020) |
| App4 | ⊕ | 1.5.2. (April 2020) |
| App5 | ⊕ | 1.5.2. (April 2020) |
| App6 | ⊕ | 1.5.2. (April 2020) |
| App7 | ⊕ | 1.5.2. (April 2020) |
| App8 | ⊕ | 1.5.2. (April 2020) |

MANAGING INSTALLATION AND UPDATES OF AN APPLICATION ON A COMPUTING DEVICE

BACKGROUND

An administrator of an organization may allow some applications, provided by an application store platform, to be installed on computing devices managed by the organization and may block some applications, provided by an application store platform, to be installed on the computing associated with the organization. For an allowed application, the application store platform may provide the latest version of the application for installation on the computing device and the application may be automatically updated to the most recent version when a new version is available. However, automatically updating an application to the latest (or newest) version may introduce one or more security and/or performance issues.

SUMMARY

This disclosure relates to a management system that enables an administrator's computing device to initiate installation of a particular version of an application (e.g., extension, web application, native application, etc.), provided by an application store platform, on a managed computing device in which the particular version is fixed (e.g., pinned) on the managed computing device to control when the application is updated to a newer version (e.g., auto-upgrades are not applied to a pinned version). When the application is pinned with a particular version, the management system transfers a copy of the application (e.g., the executable code and/or an install package for the version) from the application store platform to a data storage device. The management system transmits to the managed computing device installation data with an application identifier that identifies a location of the application on the data storage device. The managed computing device uses the application identifier to download and install the application from the data storage device.

As will be appreciated, aspects of the disclosure may provide administrators better control over the computing devices for which they are responsible. More specifically, administrators may be provided with a mechanism by which they can more effectively control what software (e.g., which version) is installed on their computing devices. New versions of applications may sometimes contain security issues that have not been resolved and/or performance issues that cause the application to malfunction and/or terminate. In addition, certain versions of applications may not interoperate properly with other software (e.g., operating system (OS) elements, applications, etc.) installed on the computing devices. Aspects of the present disclosure may therefore facilitate a reduction of instances of such security and/or performance issues that may result from automatic installation of new versions of applications. They may also allow an administrator to test and/or evaluate a particular version of an application before it is deployed to computing devices in the organization.

According to an aspect, a method for managing installation of applications includes receiving, from a first computing device associated with an administrator of an organization, a pin request to attach an application, provided by an application store platform, with a version of the application, initiating, in response to the pin request, transfer of a copy of the version of the application from the application store platform to a data storage device, generating an application identifier that identifies a location of the version of the application stored in the data storage device, and transmitting installation data to a second computing device that is managed by the organization. The installation data includes the application identifier. The application identifier is configured to be used by the second computing device to install the version of the application from the data storage device.

According to an aspect, a management system includes at least one processor and a non-transitory computer-readable medium storing executable instructions that cause the at least one processor to receive, from a first computing device associated with an administrator of an organization, a pin request to attach an application, provided by an application store platform, with a version of the application, initiate, in response to the pin request, transfer of a copy of the version of the application from the application store platform to a data storage device, generate installation data, the installation data including an application identifier that identifies a location of the version of the application that is stored on the data storage device, and transmit the installation data to a second computing device that is managed by the organization, the application identifier configured to be used by the second computing device to install the version of the application from the data storage device.

According to an aspect, a non-transitory computer-readable medium storing executable instructions that cause at least one processor to execute operations. The operations include receiving, from a first computing device associated with an administrator of an organization, a pin request to attach an application, provided by an application store platform, with a version of the application, in response to the pin request, retrieving a copy of the version of the application from the application store platform, transmitting the copy of the version of the application to a data storage device, generating an application identifier that identifies a location of the version of the application stored in the data storage device, and transmitting installation data to a second computing device that is managed by the organization. The installation data includes the application identifier. The application identifier is configured to be used by the second computing device to install the version of the application from the data storage device.

The details of one or more implementations are set forth in the accompanying drawings and the description below. Other features will be apparent from the description and drawings, and from the claims.

BRIEF DESCRIPTION OF THE DRAWINGS

FIG. 5 illustrates a user interface of an administrative console application according to another aspect.

DETAILED DESCRIPTION

Figure 1:
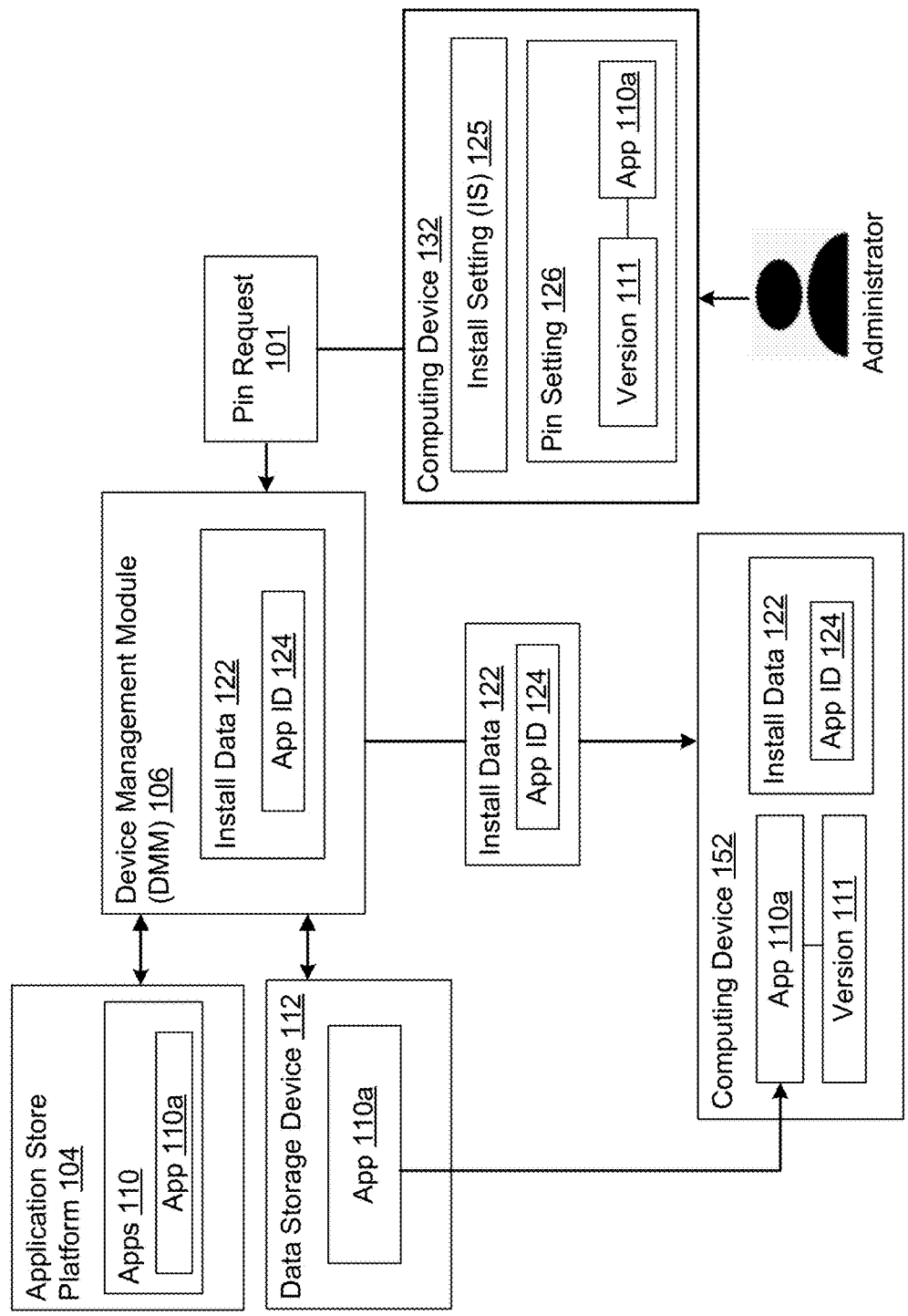
FIG. 1 illustrates a management system for managing installation and updates of applications on computing devices associated with an organization according to an aspect.

This disclosure relates to a management system that provides a technical solution of enabling an administrator's computing device to initiate installation of a particular version (e.g., the latest version, or, in some examples, a previous version) of an application (e.g., extension, web application, native application, etc.), provided by an application store platform, on a managed computing device in which the particular version is fixed (e.g., pinned) on the managed computing device to control when the application is updated to a newer version (e.g., auto-upgrades are not applied to a pinned version). In some examples, applications downloaded and installed on a computing device from an application store platform are automatically updated to a newer version when a newer version is available on the application store platform. However, the management system allows administrators to associate an application with a particular version (e.g., the latest version) to prevent the application from being automatically updated to a newer version by the application store platform. Once a particular version is pinned by the system, the application installed on the managed device remains as the particular version until the administrator unpins the version or changes the application to another pinned version.

An application store platform may be a platform that offers applications for downloading and installation for managed devices and non-managed devices. The applications may include extensions and/or web applications that are executable by a browser application. In some examples, the applications include native applications that are executable by an operating system of a computing device. In some examples, when an application is selected for installation from the application store platform (e.g., by a user or an administrator), the latest version of the application is downloaded from the application store platform and installed on the computing device, where the application is automatically updated to a newer version when the newer version is available on the application store platform. However, the newer version may contain security issues that have not been resolved and/or performance issues that cause the application to malfunction and/or terminate. In some examples, an administrator may be required to test and/or evaluate a particular version of an application before being deployed to enrolled devices.

According to the techniques discussed herein, an administrator of an organization may use their computing device to enable a pin setting for an application (provided by an application store platform), which will be installed on one or more managed computing devices. The pin setting associates an application with a particular version of the application. The administrator may use their computing device to define an installation setting. In some examples, the installation setting includes a forced installation option, which initiates installation of the particular version of the application on the managed devices (without end user involvement). In some examples, the pin setting may not be enabled until the installation setting is set as the forced installation option.

In response to the pin setting being enabled, a device management module, executable by one or more server computers, may receive a pin request from the administrator's computing device. In response to the pin request, the device management module may initiate transfer of a copy of the version of the application from the application store platform to a data storage device. The data storage device may be a data repository that is separate from the application store platform. In some examples, the data storage device is a web storage device. The device management module may retrieve the version of the application from the application store platform and transmit the version of the application to the data storage device. The device management module may generate an application identifier that identifies the location of the version of the application, which is stored in the data storage device. In some examples, the application identifier includes a resource locator. In some examples, the application identifier includes a uniform resource locator (URL).

The device management module may transmit installation data to one or more computing devices that are managed by the organization. For example, when a user activates a managed device or logs into the managed device, the managed device may receive the installation data from the device management module. The installation data may be part of a larger set of information (e.g., application management data) that define one or more policies (e.g., data loss prevention (DLP) controls, restricted or allowed applications or websites, forced installation policies, etc.) that are implemented on the user's managed computing device. The installation data includes the application identifier and may also include information that causes the managed computing device to retrieve the version of the application using the application identifier. The installation data may identify an installation URL and/or update URL as the application identifier that points to the version of the application stored on the data storage device. In response to receiving the installation data, the managed computing device may download the version of the application from the data storage device and install the version of the application on the computing device. The application is not automatically updated to a newer version when the newer version is available on the application store platform.

FIG. 1 illustrates a management system 100 according to an aspect. The management system 100 is configured to enable an administrator of an organization to associate an application 110a with a version 111 of the application 110a such that the application 110a is not automatically updated to a newer version when the newer version is available on the application store platform 104. Applications 110 downloaded and installed on a computing device 152 from an application store platform 104 are automatically updated to a newer version when the newer version is available on the application store platform 104. However, the management system 100 allows administrators to associate an application 110a with a particular version 111 (e.g., the latest version, or in some examples, a previous version) to prevent the application 110a from being automatically updated to a newer version by the application store platform 104. Once a particular version 111 is pinned by the management system 100, the application 110a installed on the computing device 152 remains as the particular version 111 until the administrator unpins the version 111 or changes the application 110a to another pinned version.

The application store platform 104 is an online digital media rights store that offers applications 110 from a variety of different application developers. The application store platform 104 is executable by one or more server computers and can be accessed via a website or a native application installed on a computing device (e.g., computing device 152, computing device 132). The application store platform 104 allows users to download and install applications 110 on their devices (e.g., managed, or non-managed devices). The applications 110 may include extensions to a browser application (e.g., a web browser). An extension (if enabled) adds a feature or function to the browser application. In some examples, an extension may be HTML, CSS, and/or JavaScript based extension. The applications 110 may include web applications. A web application may be an application program that is stored on a remote server (e.g., a web server) and delivered over a network through a browser application. Some examples of an application store platform 104 may include Chrome web store, play store, Chrome play store, Android play store, Microsoft store, Apple Store, etc.

In some examples, the applications 110 may include mobile applications configured to be installed and executed on a mobile operating system and/or a desktop operating system of the computing device 152. In some examples, the applications 110 include more non-web applications (e.g., non-browser applications), which may be programs that are at least partially stored (e.g., stored locally) on the computing device 152 and/or executable by an operating system of the computing device 152.

An administrator may use their computing device 132 to identify which applications 110 are to be installed on the organization's managed devices (one of which is illustrated as computing device 152). When defining an installation policy, for an application 110a that is pining eligible, the computing device 132 may display one or more user interface (UI) elements that allow the administrator to enable a pin setting 126 for an application 110a (provided by an application store platform 104), which will be installed on the computing device 152. Enablement of the pin setting 126 associates an application 110a with a particular version 111 of the application 110a.

In some examples, the computing device 132 may display one or more UI elements to allow the administrator to define an installation setting 125. The installation setting 125 includes a forced installation option, which initiates installation the particular version 111 of the application 110a on the computing device 152. In some examples, the pin setting 126 cannot be enabled until the installation setting 125 is set as the forced installation option.

The management system 100 includes a device management module 106. In some examples, the device management module 106 is executable by one or more server computers. The device management module 106 may communicate with the computing device 132 and any managed devices (e.g., computing device 152) over a network. In response to the pin setting 126 being enabled, the device management module 106 may receive a pin request 101 from the computing device 132. The pin request 101 may include information that indicates that the pin setting 126 is enabled. In some examples, the pin request 101 includes information that identifies the application 110a and the version 111.

In response to the pin request 101, the device management module 106 may initiate transfer of a copy of the version 111 of the application 110a from the application store platform 104 to a data storage device 112. The copy of the version 111 may include the executable code of the version 111 of the application 110a. In some examples, the copy of the version 111 includes an installation package for the version 111 of the application 110a. In some examples, the copy of the version 111 includes a file (e.g., an extension file or web application file). The file may be saved in a compressed format and may contain JavaScript (JS) code, JavaScript Object Notation (JSON) file, or other file(s) (e.g., executable programs and/or images). Generally, an installation package includes the information that an OS installer or a browser application requires to install the version 111 of the application 110a. The type of information included within an installation package may vary depending on the platform, but can generally include one or more of a file, an installation database, a summary information stream, or one or more data streams for one or more parts of the installation. The file can also contain one or more transforms, internal source files, and/or external source files or cabinet files required by the installation. In some examples, the data storage device 112 is a memory device associated with the device management module 106. The data storage device 112 may be a data repository that is separate from the application store platform 104. In some examples, the data storage device 112 is a web storage device. The device management module 106 may retrieve the version 111 of the application 110a from the application store platform 104 and transmit the version 111 of the application 110a to the data storage device 112.

The device management module 106 may generate an application identifier 124 that identifies the location of the version 111 of the application 110a on the data storage device 112. The application identifier 124 is different from the default identifier that is provided from the application store platform 104 for unpinned applications. For example, if the application 110a is unpinned, the installation data 122 includes an application identifier that points to the application store platform 104. However, if an application 110a is pinned, a new application identifier 124 is generated and is included in the installation data 122. In some examples, the application identifier 124 includes a resource locator that identifies the location of the version 111 on the data storage device 112. In some examples, the application identifier 124 includes a uniform resource locator (URL) that identifies the location of the version 111 on the data storage device 112.

The device management module 106 may transmit installation data 122 to the managed devices, which includes the computing device 152. In some examples, the device management module 106 includes a download manager server that is configured to distribute the installation data 122 to the managed devices. For example, when a user activates the computing device 152 or logs into the computing device 152, the computing device 152 may receive the installation data 122 from the device management module 106. The installation data 122 may be part of a larger set of information (e.g., application management data) that define one or more policies (e.g., data loss prevention (DLP) controls, restricted or allowed applications or websites, forced installation policies, etc.) that are implemented on the computing device 152. The installation data 122 includes the application identifier 124. The application identifier 124, when used by the computing device 152, causes the computing device 152 to retrieve the version 111 of the application 110a from the data storage device 112. In some examples, the application identifier 124 is an installation URL. In some examples, the application identifier 124 is an update URL. In response to receiving the installation data 122, the computing device 152 may download the version 111 of the application 110a from the data storage device 112 and install the version 111 of the application 110a on the computing device 152. The application 110a is not automatically updated to a newer version when the newer version is available on the application store platform 104.

Installation of the application 110a on the computing device 152 may include associating (or attaching) the version 111 of the application 110a (e.g., a web application or extension) to a browser application of the user (or user account) of the browser application. The browser application may be a web browser configured to access information on the Internet. In some examples, the browser application is a separate application from the operating system of the computing device 152, where the browser application is installable on (and executable by) the operating system. In some examples, the browser application is the device's operating system (or included as part of the device's operating system). The browser application may launch one or more browser tabs in the context of one or more browser windows on a display of the computing device 152. In some examples, the associating (or attaching) the application 110a to the browser application, causes the application 110a to be available to any computing devices 152 associated with a particular user account. In some examples, the application 110a may be installed on the browser application. In some examples, installation of the application 110a on the computing device 152 may include downloading the application 110a (or a portion of the application 110a) from the data storage device 112, where the application 110a (or a portion of the application 110a) is installed on the browser application.

The application store platform 104, the data storage device 112, and the device management module 106 are executable by one or more server computers. The server computer(s) may include one or more processors formed in a substrate, an operating system (not shown) and one or more memory devices. The memory devices may represent any kind of (or multiple kinds of) memory (e.g., RAM, flash, cache, disk, tape, etc.). In some examples (not shown), the memory devices may include external storage, e.g., memory physically remote from but accessible by the server computer(s). In some examples, the application store platform 104 is executable by server computer(s) owned and/or managed by an entity (e.g., company) that also manages or owns the server computer(s) that execute the device management module 106. In some examples, the application store platform 104 is executable by server computer(s) owned or managed by an entity (e.g., company) that is different from an entity that manages or owns the server computer(s) that execute the device management module 106.

FIGS. 2A through 2E illustrate a management system 200 according to another aspect. The management system 200 may be an example of the management system 100 of FIG. 1 and may include any of the details discussed with reference to that figure. The management system 200 is configured to manage the installation and upgrades of applications 210, offered by an application store platform 204, on computing devices 252 associated with an organization. The management system 200 includes an administrator's computing device 232, a device management module 206, an application store platform 204, a data storage device 212, and a user's computing device 252.

The management system 200 is configured to initiate installation of a version 211 of an application 210a, provided by an application store platform 204, on a computing device 252 in which the version 211 is fixed (e.g., pinned) on the computing device 252 to control when the application 210a is updated to a newer version (e.g., auto-upgrades are not applied to the application 210a). Generally, applications 210 downloaded and installed on a computing device 252 from an application store platform 204 are automatically updated to a newer version when the newer version is available. However, the management system 200 allows administrators to associate (e.g., attach, fix, or pin) an application 210a to a particular version 211 (e.g., the latest version, or, in some examples, a previous version) to prevent the application 210a from being automatically updated to a newer version by the application store platform 204, so that an organization is not affected by the negative impact caused by application upgrades. For example, in response to a newer version of the application 210a becoming available on the application store platform 204, the version 211 in the data storage device 212 differs from the newer version until a subsequent pin request 201 is generated that attaches the application 210a to the newer version. In other words, the version 211 of the application 210a continues to execute on the managed devices despite the newer version of the application 210a being available on the application store platform 204 and upgraded (e.g., automatically upgraded) on non-managed devices.

The application store platform 204 allows users to download and install applications 210, provided by the application store platform 204, on their devices. FIG. 2E illustrates an example interface of an application store platform 204 in which users can search and install applications 210 on their devices (e.g., managed devices or non-managed devices). Application 210a is one of the applications 210 provided by the application store platform 204. In some examples, the applications 210 include web applications. A web application may be an application program that is stored on a remote server (e.g., a web server) and delivered over a network 250 through a browser application 266. In some examples, a web application may be a progressive web application, which can be stored (at least in part) on the computing device 252 and used offline.

In some examples, the applications 210 includes mobile applications configured to be installed and executed on a mobile operating system and/or a desktop operating system. In some examples, the applications 210 include more non-web applications (e.g., non-browser applications), which may be programs that are at least partially stored (e.g., stored locally) on the computing device 252 and/or executable by an operating system 254 of the computing device 252. In some examples, the applications 210 are extensions to the browser application 266. An extension (if enabled) adds a feature or function to the browser application 266. In some examples, an extension is a web browser extension. In some examples, an extension may be HTML, CSS, and/or JavaScript based. Some examples of an application store platform 204 may include Chrome web store, play store, Chrome play store, Android play store, Microsoft store, Apple Store, etc.

In some examples, a user may use the browser application 266 to visit a website of the application store platform 204 to view applications 210 offered by the application store platform 204 (e.g., interface 265 of FIG. 2E). In some examples, the application store platform 204 is associated with an application that is downloaded and installed on the operating system 254 and the user can use the application to view applications 210 offered by the application store platform 204. The user can search, filter, and/or scroll through available applications 210 that are available to be installed via the application store platform 204.

The computing device 232 includes an administrative console application 235 configured to manage computing devices associated with the organization (one of which is illustrated as computing device 252). In some examples, the administrative console application 235 is a web application executable (at least in part) by a browser application to render the user interface 237. In some examples, the administrative console application 235 is a native application installed and executed by an operating system of the computing device 232. An administrator may use their computing device 232 to identify which applications 210 are to be installed on the organization's managed devices. For example, the user interface 237 may display a list of applications 210 that can be selected to be installed on the managed devices. Some or all the applications 210 may be eligible to be pinned.

The device management module 206 may include a pin eligibility unit 214 configured to determine whether an application 210a is eligible to be pinned, and, if so, may set a pin eligibility setting 215 to a particular value (e.g., a Boolean value). The pin eligibility setting 215 having a first value may cause the administrative console application 235 to render one or more UI elements (e.g., a selectable icon, a menu, a menu item, etc.) to allow the administrator to pin an application 210a, e.g., to attach the application 210a to a particular version 211 of the application 210. In other words, the pin eligibility setting 215 having the first value may allow a pin setting 226 to be displayed, which the administrator can select (e.g., enable, activate) to pin a particular version 211. The pin eligibility setting 215 having a second value indicates that the application 210a is not pinning eligible.

To determine whether an application 210a is eligible to be pinned, the pin eligibility unit 214 may communicate with the application store platform 204 via one or more application programming interface(s) (API(s)) 218. The API(s) 218 may be an interface that allows the application store platform 204 and the device management module 206 to communicate with each other. In some examples, the API(s) 218 are defined at the device management module 206. In some examples, the API(s) 218 are defined at the application store platform 204.

Figure 2A:
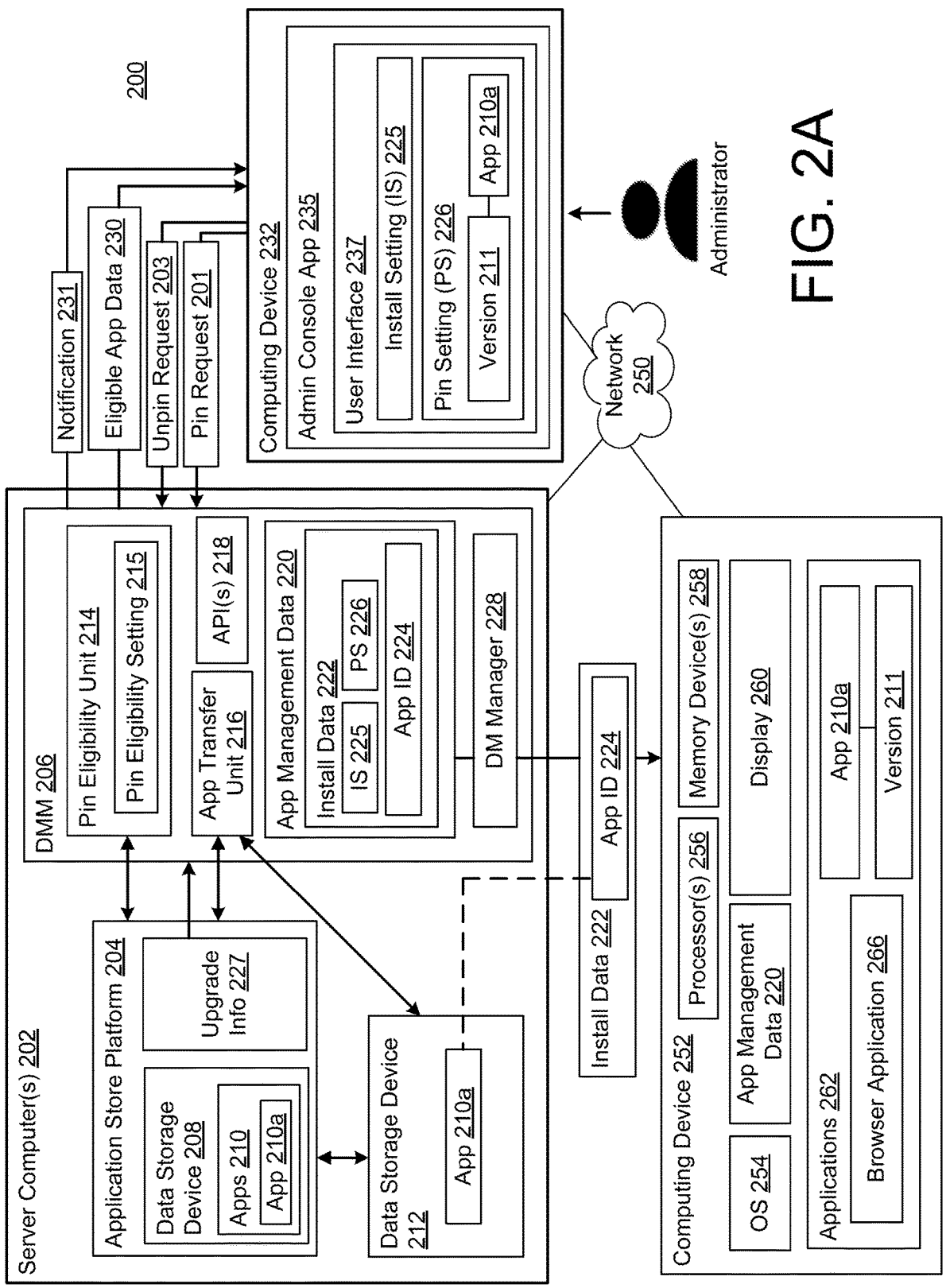
FIG. 2A illustrates a management system for managing installation and updates of applications on computing devices associated with an organization according to another aspect.
Figure 2B:
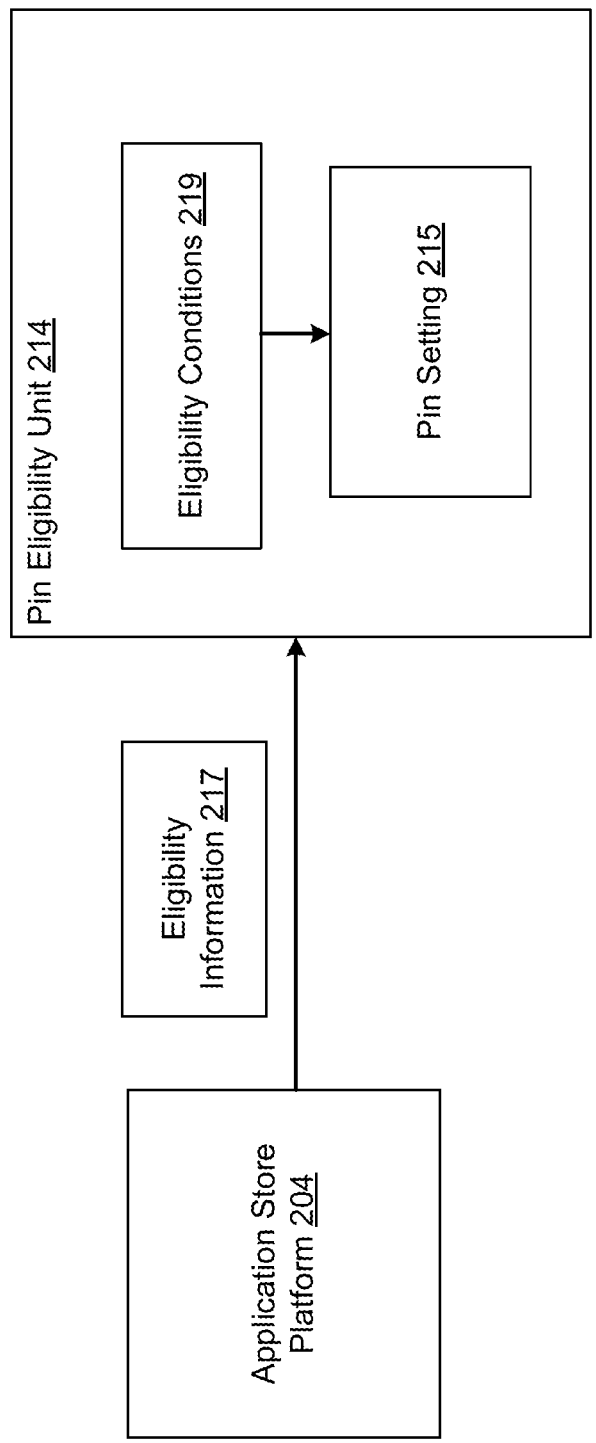
FIG. 2B illustrates an example of a pin eligibility unit of the management system according to an aspect.

As shown in FIGS. 2A and 2B, the pin eligibility unit 214 may receive eligibility information 217 about an application 210a via the API(s) 218 and determine whether the application 210a is pin eligible (e.g., determine a value for the pin eligibility setting 215 for the application 210a from a first value and a second value) based on whether or not the eligibility information 217 meets one or more eligibility condition(s) 219. The eligibility information 217 includes information about one or more attributes of the application 210a. In some examples, the eligibility information 217 includes information on whether the application 210a is visible for browsing, whether the application 210a is listed, whether the application 210a is public, and/or whether the application 210 is a paid application or unpaid application. If the attributes of the application 210a satisfy the eligibility condition(s) 219, the pin eligibility unit 214 may set the pin eligibility setting 215 as the first value. If the attributes of the application 210a do not satisfy one or more eligibility condition(s) 219, the pin eligibility unit 214 may set the pin eligibility setting 215 as the second value. In some examples, if the application 210 is visible for browsing, listed, public, and/or unpaid, the pin eligibility unit 214 is configured to mark the application 210a as pin eligible (e.g., set the pin eligibility setting 215 as the first value).

The device management module 206 may transmit eligible application data 230 to the computing device 232. The eligible application data 230 may identify which applications 210 are pin eligible. The eligible application data 230 may cause the administrative console application 235 to render one or more UI elements that identifies which applications 210 are pin eligible.

When defining an installation policy for an application 210a that is pinning eligible, the user interface 237 may display one or more UI elements that allow the administrator to activate a pin setting 226 for the application 210a. When the pin setting is activated (e.g., set or enabled), the device management module 206 associates the application 210a to a particular version 211. In some examples, the version 211 is the latest version of the application 210a. In some examples, the version 211 is a previous version of the application 210a. Also, the user interface 237 may display one or more UI elements to allow the administrator to define an installation setting 225. In some examples, the installation setting 225 includes a forced installation option. The forced installation option initiates installation of the particular version 211 of the application 210a on the computing device 252 without the user of the computing device 252 initiating or facilitating the installment. In some examples, the pin setting 226 is not displayed or not allowed to be activated until the installation setting 225 is set as the forced installation option.

In response to the pin setting 226 being enabled, the device management module 206 may receive a pin request 201, over a network 250, from the computing device 232. In response to the pin request 201, the device management module 206 may update or generate installation data 222 that identifies the application 210a and the information about the version 211 to be installed on the managed computing devices. In some examples, the installation data 222 is an installation policy that is distributed to the managed computing devices. In some examples, the installation data 222 includes a forced installation list that identifies one or more applications 210 to be installed on the managed computing devices.

As further explained below, in response to the pin request 201, the device management module 206 may store an entry 242a (e.g., a database entry) in a version history database 240, facilitate the transfer of a copy of the application 210a from the application store platform 204 to a data storage device 212, generate (or update) installation data 222 to include an application identifier 224 that identifies the location of the version 211 of the application 210a on the data storage device 212, and transmit the installation data 222 to any managed devices (including computing device 152), where the installation data 222 may be used by the managed devices to retrieve the version 211 of the application 210a from the data storage device 212 and install the version 211 on the managed devices As noted above, the installation data 222 may cause the managed devices to retrieve and install the version 211, e.g. when a user activates a managed device.

The device management module 206 may generate an application identifier 224 that identifies the location of the version 211 of the application 210a on the data storage device 212. The application identifier 224 is different from the default identifier that is provided from the application store platform 204 for unpinned applications. For example, if the application 210a is unpinned, the installation data 222 includes an application identifier that points to the location of the latest version of application 210a on the application store platform 204. However, if an application 210a is pinned, a new application identifier 224 is generated and is included in the installation data 222. In some examples, the application identifier 224 includes a resource locator that identifies the location of the version 211 on the data storage device 212. In some examples, the application identifier 224 includes a uniform resource locator (URL) that identifies the location of the version 211 on the data storage device 212.

The device management module 206 may transmit installation data 222 to the managed devices, which includes the computing device 252. In some examples, the device management module 206 includes a download manager 228 configured to transmit the installation data 222 (or more broadly the application management data 220) to the computing device 252 (and any other managed computing device associated with the organization). For example, when a user activates the computing device 252 or logs into the computing device 252, the computing device 252 may receive the installation data 222 from the device management module 206.

The installation data 222 may be part of a larger set of information (e.g., application management data 220) that define one or more policies (e.g., data loss prevention (DLP) controls, restricted or allowed applications or websites, forced installation policies, etc.) that are transmitted to and implemented on the computing device 252. In some examples, the application management data 220 may include which applications 210 are forceable installed and/or which applications 210 are allowed and/or denied. In some examples, the application management data 220 may include an allow list that identifies applications 210 allowed by the administrator to be installed on the computing devices 252. In some examples, the application management data 220 includes a block list that identifies applications 210 that are blocked from being installed on the computing devices 252. In some examples, the application management data 220 includes a force install list that identifies applications 210 that are force-installed the computing devices 252.

The application identifier 224, when used by the computing device 252, causes the computing device 252 to retrieve the version 211 of the application 210*a* from the data storage device 212. In some examples, the application identifier 224 is an installation URL. In some examples, the application identifier 224 is an update URL. In response to receiving the installation data 222, the computing device 152 may download the version 211 of the application 210*a* from the data storage device 212 and install the version 211 of the application 210*a* on the computing device 252. The application 210*a* is not automatically updated to a newer version when the newer version is available on the application store platform 104.

Installation of the application 210*a* on the computing device 252 may include associating (or attaching) the version 211 of the application 210*a* (e.g., a web application or extension) to a browser application of the user (or user account) of the browser application. In some examples, the associating (or attaching) the application 210*a* to the browser application, causes the application 210*a* to be available to any computing devices 152 associated with a particular user account. In some examples, the application 210*a* may be installed on the browser application. In some examples, installation of the application 210*a* on the computing device 152 may include downloading the application 210*a* (or a portion of the application 210*a*) from the data storage device 212, where the application 210*a* (or a portion of the application 210*a*) is installed on the browser application.

Before the installation data 222 is distributed to the managed devices, a copy of the version 211 of the application 210*a* is transferred to a data storage device 212. For example, the device management module 206 includes an application transfer unit 216 configured to facilitate the transfer of a copy of the application 210*a* from the application store platform 204 to the data storage device 212. In some examples, the version 211 of the application 210*a* is stored in a data storage device 208 associated with the application store platform 204. In some examples, the data storage device 208 of the application store platform 204 stores the latest version of applications 210 offered by the application store platform 204. In some examples, the data storage device 208 of the application store platform 204 stores the latest version and one or more previous versions of applications 210 offered by the application store platform 204.

In response to the pin request 201, the application transfer unit 216 transfers the version 211 of the application 210*a*, stored in the data storage device 208 of the application store platform 204, to the data storage device 212. In some examples, the application transfer unit 216 transmits information to the data storage device 212 that causes the data storage device 212 to retrieve the application 210*a* from the data storage device 208 of the application store platform 204. In some examples, the application transfer unit 216 may retrieve the application 210*a* from the data storage device 208 of the application store platform 204 and may transfer the application 210*a* to the data storage device 212. The data storage device 112 may be external to the application store platform 204. The data storage device 112 may be a data repository that is separate from the application store platform 104. In some examples, the data storage device 112 is a web storage device.

Figure 2C:
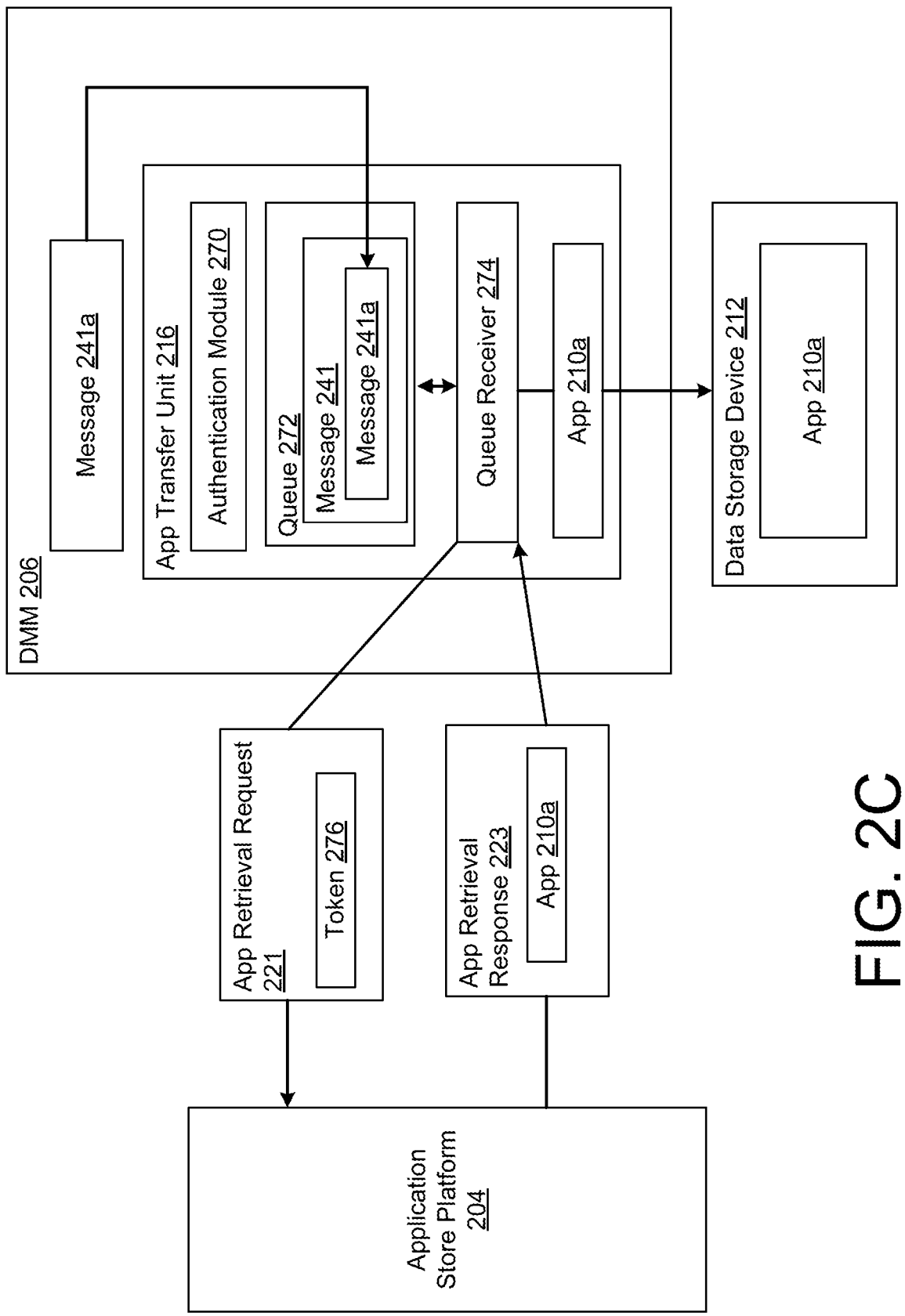
FIG. 2C illustrates an example of a device management module of the management system according to an aspect.

Referring to FIG. 2C, in response to the pin request 201, the device management module 206 may generate a message 241*a* and store the message 241*a* in a queue 272. The message 241*a* represents the particular pin request 201. In some examples, the message 241*a* represents a request to retrieve and store the application 210*a* in the data storage device 212. The message 241*a* may include information that identifies the application 210*a* and/or the location of the application 210*a* that is stored in the data storage device 208 of the application store platform 204. In some examples, the message 241*a* includes the resource locator (e.g., URL) of the application 210*a* that points to the location of the application 210*a* on the application store platform 204.

The queue 272 may store a plurality of messages 241. Each message 241 corresponds to a separate pinned application 210*a* that will be transferred from the data storage device 208 of the application store platform 204 to the data storage device 212. The application transfer unit 216 may include a queue receiver 274 configured to select a particular message 241 from the queue 272, where selection of a particular message 241 causes the queue receiver 274 to transfer the respective application 210*a* from the data storage device 208 to the data storage device 212. In some examples, the queue receiver 274 sequentially selects each message 241*a*, where the next message 241 is selected upon completion of an application transfer initiated from a previous message 241. In some examples, the queue receiver 274 may execute two or more application transfers in parallel (at least partially in parallel). In some examples, the queue receiver 274 may select two or more messages 241 at the same time or around the same time.

When the message 241*a* is selected by the queue receiver 274, the queue receiver 274 may generate and send an application retrieval request 221 to the application store platform 204. In some examples, the queue receiver 274 may transmit the application retrieval request 221 to the application store platform 204 via the API(s) 218. The application retrieval request 221 may identify the application 210a and information that directs the application store platform 204 to transmit the version 211 of the application 210a back to the device management module 206. In response to the application retrieval request 221, the application store platform 204 may obtain the version 211 of the application 210a from the data storage device 208 and transmit, via the API(s) 218, the application 210a to the queue receiver 274 in an application retrieval response 223.

In some examples, the application transfer unit 216 includes an authentication module 270 configured to authenticate the pin request 201. When authenticated, the authentication module 270 may generate a token 276 and include the token 276 in the application retrieval request 221. In some examples, the administrator's credential is used to authenticate the pin request 201, which, when authenticated, causes the token 276 to be generated. In some examples, the token 276 is included in a header of the application retrieval request 221. The application store platform 204 may return the application 210a to the device management module 206 if the application retrieval request 221 includes the token 276. The queue receiver 274 may receive the application 210a via the application retrieval response 223. The queue receiver 274 may store the version 211 of the application 210a in the data storage device 212.

Figure 2D:
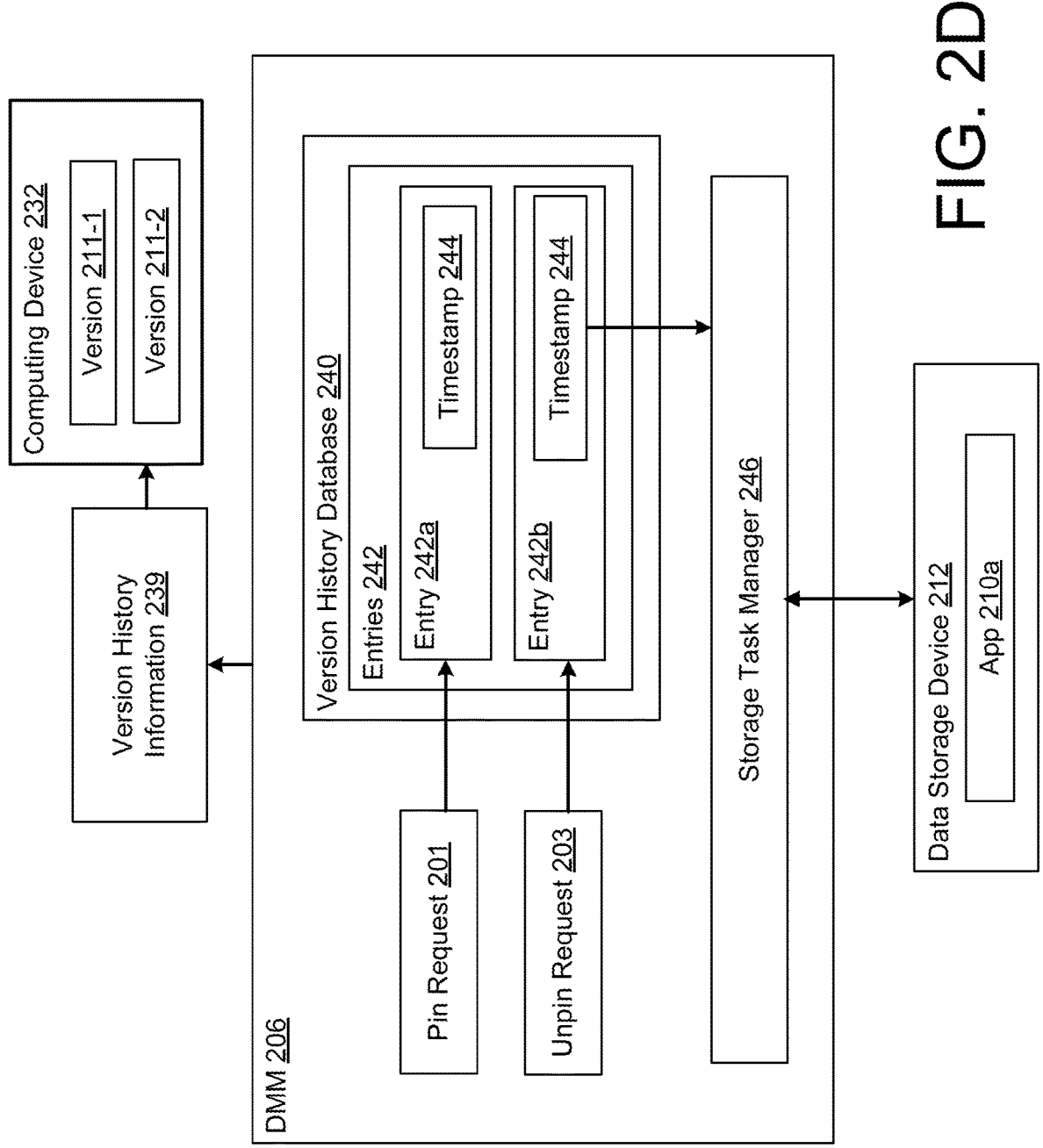
FIG. 2D illustrates an example of the device management module of the management system according to another aspect.
Figure 2E:
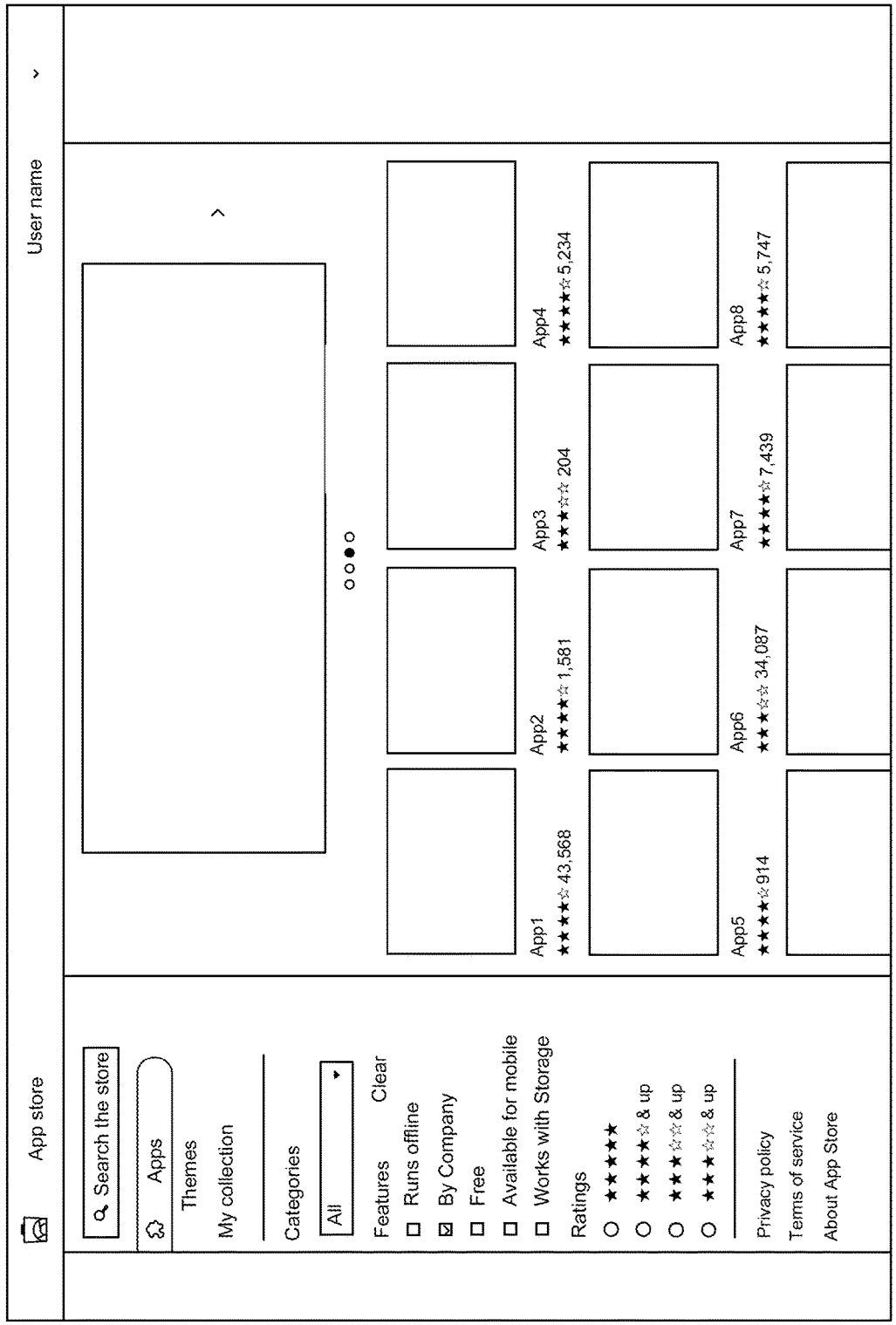
FIG. 2E illustrates a user interface of an application store platform according to an aspect.

Referring to FIG. 2D, the device management module 206 includes a version history database 240. In response to the pin request 201, the device management module 206 may generate an entry 242a in the version history database 240. In some examples, the device management module 206 may generate the entry 242a in the version history database 240 before a copy of the application 210a is transferred to the data storage device 212. The entry 242a may identify the version 211 of the application 210a. In some examples, the entry 242 includes a timestamp 244 that identifies a time (e.g., date, time) at which the pin request 201 was received. The version history database 240 may store entries 242 associated with any versions of applications 210 that have been pinned. For example, the version history database 240 stores one or more entries 242a of previous versions of the application 210a in the version history database 240. With respect to the application 210a, the version history database 240 may store an entry 242a that identifies a first version 211-1 of the application 210a and another entry 242a that identifies a second version 211-2 of the application 210a. The first version 211-1 may be the latest version (or a version that was released before the latest version), and the second version 211-2 may be a version of the application 210a that was released before the first version 211-1.

In some examples, the device management module 206 may use the version history database 240 to allow the administrator to select a previous version (e.g., not the latest version) of the application 210a for pinning. For example, the device management module 206 may transmit version history information 239 to the computing device 232 that causes the administrative console application 235 to display information that identifies different versions of the application 210, e.g., the first version 211-1 and the second version 211-2. In some examples, the device management module 206 obtains the version history information 239 from the version history database 240 before the pin request 201 is generated, and the device management module 206 sends the version history information 239 to the computing device 232, so that the administrator can view and select other versions (besides the latest version). In some examples, the administrative console application 235 displays one or more UI elements that enables the administrator to select the first version 211-1 or the second version 211-2 for pinning. For example, the first version 211-1 and the second version 211-2 may be pinning candidates for selection by the administrator. In some examples, only the latest version of the application 210a is eligible for pinning.

Referring to FIGS. 2A and 2D, an administrator may unpin a version 211, which causes the device management module 206 to receive an unpin request 203 that dissociates the version 211 from the application 210a. For example, an administrator may deactivate the pin setting 226, which causes the unpin request 203 to be generated and sent to the device management module 206. In response to the unpin request 203, the device management module 206 may store an entry 242b in a version history database 240. The entry 242b may identify the application 210a and include information that the version 111 is not pinned to the application 210a. The entry 242b may include a timestamp 244 that identifies a time associated with the unpin request 203 (e.g., the time at which the unpin request 203 was generated or received by the device management module 206). The device management module 206 may use the entry 242b to determine whether a time of the unpin request 203 is greater than a threshold amount of time (e.g., one day, one week, one month, etc.), and, if so, may cause the version 211 of the application 210a to be deleted from the data storage device 212.

The device management module 206 may include a storage task manager 246 that is configured to execute a database task (e.g., deletion task) on the data storage device 212. The storage task manager 246 may delete unpinned applications 210 from the data storage device 212. In some examples, the storage task manager 246 is configured to delete applications 210 that have been unpinned for over a threshold period of time. For example, the storage task manager 246 may periodically obtain information from the version history database 240 to determine whether the time indicated by the timestamp 244 of the entry 242b is greater than a threshold period of time. If the time indicated by the timestamp 244 of the entry 242b is greater than the threshold period of time, the storage task manager 246 may delete the application 210a from the data storage device 212.

In some examples, the device management module 206 may receive upgrade information 227 from the application store platform 204, where the upgrade information 227 indicates that a newer version of the application 210a is available. In some examples, the upgrade information 227 may include a flag. In some examples, a flag includes a bit or a bit sequence that includes a binary value (e.g., a binary value with a first value indicates that an update is available, a binary value with a second value indicates that an update is not available). In some examples, the upgrade information 227 may identify which application 210 is available for an upgrade. The device management module 206 may transmit a notification 231 to the computing device 232, where the notification 231 indicates that the newer version of the application 210a is available. In some examples, the notification 231 includes a link to download and install the new version from the application store platform 104. In response to the notification 231, the administrator may evaluate and test the newer version. In some examples, the administrator may decide to upgrade to the newer version. For example, the administrator may use the user interface 237 to generate another pin request 201 that identifies the newer version, and the management system 200 performs the same operations described above.

The application store platform 204, the data storage device 212, and the device management module 206 are executable by one or more server computers 202. The server computer(s) 202 may include one or more processors formed in a substrate, an operating system (not shown) and one or more memory devices. The memory devices may represent any kind of (or multiple kinds of) memory (e.g., RAM, flash, cache, disk, tape, etc.). In some examples (not shown), the memory devices may include external storage, e.g., memory physically remote from but accessible by the server computer(s) 202. In some examples, the application store platform 204 is executable by server computer(s) 202 owned and/or managed by an entity (e.g., company) that also manages or owns the server computer(s) 202 that execute the device management module 206. In some examples, the application store platform 204 is executable by server computer(s) 202 owned or managed by an entity (e.g., company) that is different from an entity that manages or owns the server computer(s) 202 that execute the device management module 206.

The device management module 206 may store the application management data 220 (including the installation data 222) on one or more memory devices associated with the server computer(s) 202. The device management module 206 may transmit the application management data 220 (including the installation data 222) to computing devices 252 associated with the organization. In some examples, the device management module 206 may identify the device identifiers, browser identifiers, and/or operating system identifiers for users having computing devices 252 associated with the organization and send the application management data 220 to the appropriate devices, web browsers, and/or operating systems of the computing devices 252. The computing device 252 may store the application management data 220 (including the installation data 222) in a memory device 258 associated with the computing device 252. In some examples, the computing device 252 may store the pin eligibility setting 215, the pin setting 226, and/or the installation setting 225 in the memory device 258.

The computing device 252 may be any type of computing device that includes one or more processors 256, one or more memory devices 258, a display 260, and an operating system 254 configured to execute (or assist with executing) one or more applications 262 (including the browser application 266 and the application 210a). In some examples, the computing device 252 is a laptop or desktop computer. In some examples, the computing device 252 is a tablet computer. In some examples, the computing device 252 is a smartphone. In some examples, the computing device 252 is a wearable device. In some examples, the display 260 is the display of the computing device 252. In some examples, the display 260 may also include one or more external monitors that are connected to the computing device 252. The operating system 254 is a system software that manages computer hardware, software resources, and provides common services for computing programs. In some examples, the operating system 254 is an operating system designed for a larger display 260 such as a laptop or desktop (e.g., sometimes referred to as a desktop operating system). In some examples, the operating system 254 is an operating system for a smaller display 260 such as a tablet or a smartphone (e.g., sometimes referred to as a mobile operating system).

The processor(s) 256 may be formed in a substrate configured to execute one or more machine executable instructions or pieces of software, firmware, or a combination thereof. The processor(s) 256 can be semiconductor-based—that is, the processors can include semiconductor material that can perform digital logic. The memory device(s) 258 may include a main memory that stores information in a format that can be read and/or executed by the processor(s) 256. The memory device(s) 258 may store the application management data 220 and applications (e.g., the operating system 254, applications 262, etc.) that, when executed by the processors 256, perform certain operations.

The computing device 232 may be an example of the computing device 252 and may include any of the features discussed with reference to the computing device 252. For example, the computing device 232 may be a laptop or a desktop computer. In some examples, the computing device 232 may be a tablet or a smartphone. The computing device 232 may include one or more processors and one or more memory devices. In some examples, the computing device 232 is associated with an administrator of an organization. For example, the administrator may be associated with an organization that owns or manages the computing device 252. For example, the computing device 252 (and the computing device 232) may be an enterprise-owned computing device such as a work computer owned or managed by the user's company or a school computer owned or managed by the user's school.

The computing device 252 (and the computing device 232) may communicate with the server computer(s) 202 over the network 250. The server computer 202 may be computing devices that take the form of a number of different devices, for example a standard server, a group of such servers, or a rack server system. In some examples, the server computer(s) 202 may be a single system sharing components such as processors and memories. In some examples, the server computer(s) 202 may be multiple systems that do not share processors and memories. The network 250 may include the Internet and/or other types of data networks, such as a local area network (LAN), a wide area network (WAN), a cellular network, satellite network, or other types of data networks. The network 250 may also include any number of computing devices (e.g., computer, servers, routers, network switches, etc.) that are configured to receive and/or transmit data within network 250. Network 250 may further include any number of hardwired and/or wireless connections.

The server computer(s) 202 may include one or more processors formed in a substrate, an operating system (not shown) and one or more memory devices. The memory devices may represent any kind of (or multiple kinds of) memory (e.g., RAM, flash, cache, disk, tape, etc.). In some examples (not shown), the memory devices may include external storage, e.g., memory physically remote from but accessible by the server computer(s) 202. The server computer(s) 202 may include one or more modules or engines representing specially programmed software.

Figure 3:
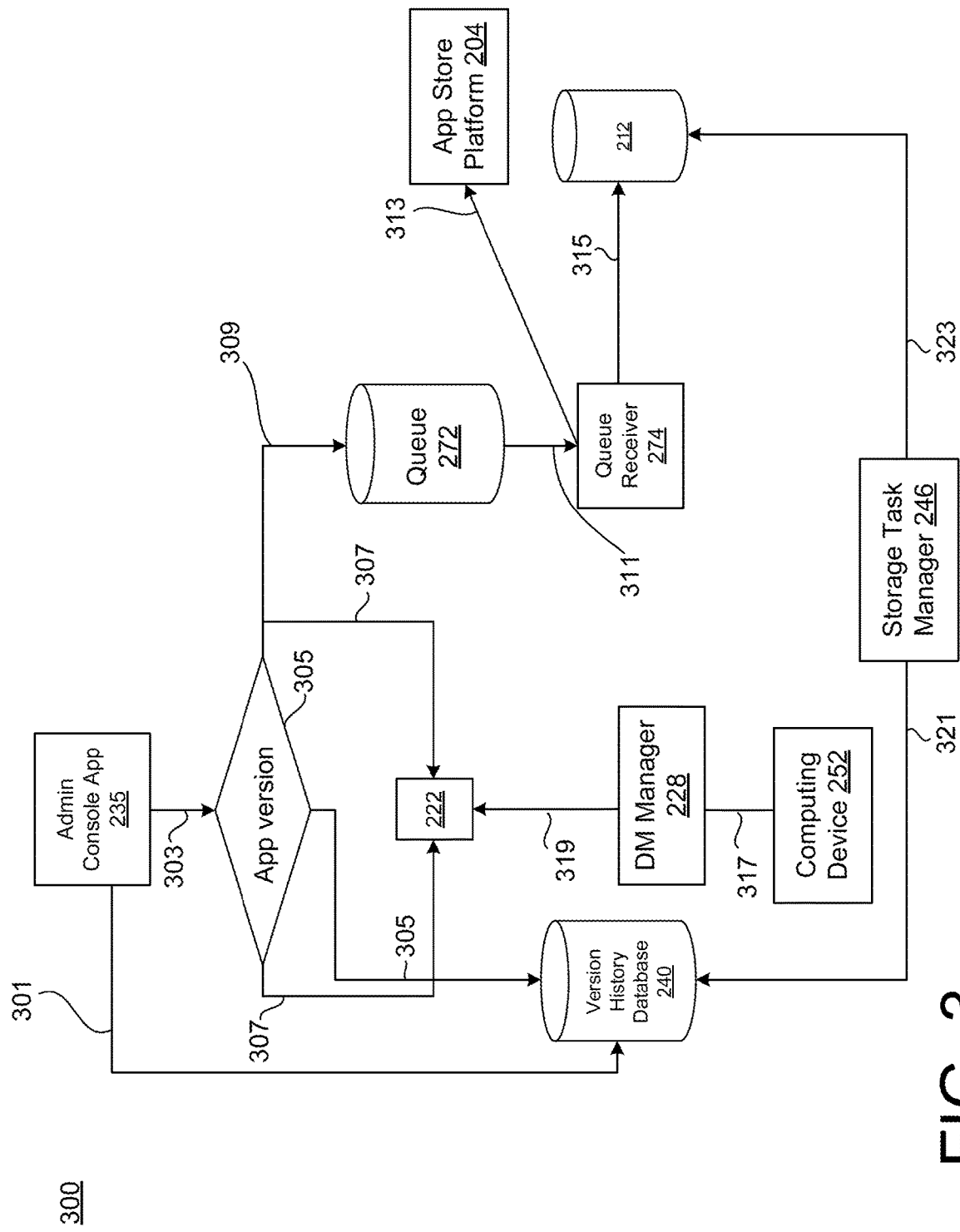
FIG. 3 illustrates a flowchart depicting example operations of a management system according to an aspect.

FIG. 3 illustrates a flowchart 300 depicting example operations of a management system according to an aspect. Although the flowchart 300 is explained with respect to the management system 200 of FIGS. 2A through 2E, the flowchart 300 may be applicable to any of the embodiments discussed herein. Although the flowchart 300 of FIG. 3 illustrates the operations in sequential order, it will be appreciated that this is merely an example, and that additional or alternative operations may be included. Further, operations of FIG. 3 and related operations may be executed in a different order than that shown, or in a parallel or overlapping fashion.

The flowchart 300 includes operations enabling an administrator's computing device 232 to initiate installation of a particular version 211 (e.g., the latest version) of an application 210a (e.g., extension, web application, native application, etc.), provided by an application store platform 204, on a managed computing device 252 in which the particular version 211 is fixed (e.g., pinned) on the managed computing device 252 to control when the application 210a is updated to a newer version (e.g., auto-upgrades are not applied to a pinned version). The flowchart 300 includes operations to associate an application 210a with a particular version 211 (e.g., the latest version) to prevent the application 210a from being automatically updated to a newer version by the application store platform 204. Once a particular version 211 is pinned by the management system 200, the application 210a installed on the managed computing device 252 remains as the particular version 211 until the administrator unpins the version or changes the application 210a to another pinned version 211.

In operation 301, in some examples, the administrative console application 235 may retrieve version history information 239 from the version history database 240. The version history information 239 may cause the administrative console application 235 to display which versions 211 (e.g., first version 211-1, second version 211-2) that can be selected to be pinned. In operation 303, the administrative console application 235 may receive a selected version 211. In some examples, the selected version 211 is the latest version. In some examples, the selected version 211 is a previous version.

In operation 305, the device management module 206 may generate an entry 242a in the version history database 240 that identifies the application 210a, the selected version 211, and a timestamp 244 associated with the pin request 201. If the version 211 is the previous version or the latest version, in operation 307, the device management module 206 may update installation data (or application management data 220) to identify the selected version 211. If the version 211 is the latest version, in operation 309, the device management module 206 may generate and store a message 241a in a queue 272. The message 241a represents the particular pin request 201. In some examples, the message 241a represents a request to retrieve and store the application 210a in the data storage device 212.

In operation 311, a queue receiver 274 may select the message 241a to retrieve and store the application 210a in the data storage device 212. In operation 313, the queue receiver 274 fetches the version 211 of the application 210a from the application store platform 204. In operation 315, the queue receiver 274 may transfer the application 210a to the data storage device 212. For example, when the message 241a is selected by the queue receiver 274, the queue receiver 274 may generate and send an application retrieval request 221 to the application store platform 204. In some examples, the queue receiver 274 may transmit the application retrieval request 221 to the application store platform 204 via the API(s) 218. The application retrieval request 221 may identify the application 210a and information that directs the application store platform 204 to transmit the version 211 of the application 210a back to the device management module 206. In response to the application retrieval request 221, the application store platform 204 may obtain the version 211 of the application 210a from the data storage device 208 and transmit, via the API(s) 218, the application 210a to the queue receiver 274 in an application retrieval response 223.

In operation 317, the computing device 252 may fetch the installation data 222 from the download manager 228. In operation 319, the download manager 228 may fetch the installation data 222 and construct the application identifier 224. In operation 321, the storage task manager 246 may obtain information from the version history database 240 to determine whether to delete an unpinned application from the data storage device 212. If the timestamp 244 of the entry 242b is greater than a threshold period of time, in operation 323, the storage task manager 246 is configured to communicate with the data storage device 212 to delete the application 210a, e.g., sending a deletion task to the data storage device 212 to delete the version 211 of the application 210a from the data storage device 212.

Figure 4:
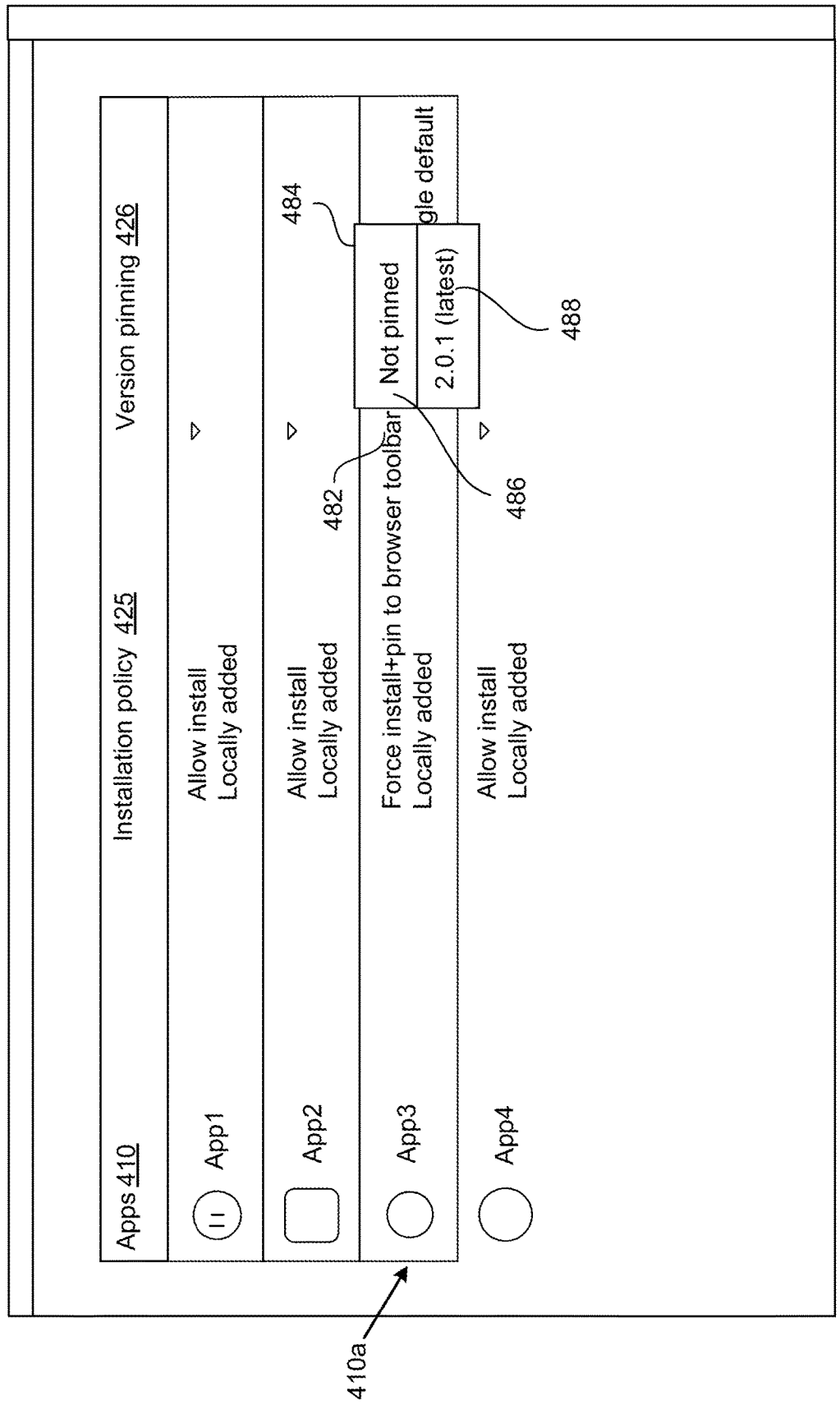
FIG. 4 illustrates a user interface of an administrative console application according to an aspect.

FIG. 4 illustrates a user interface 437 of an administrative console application according to an aspect. The user interface 437 displays a list of applications 410, including an application 410a. The user interface 437 displays an installation setting 425 and a pin setting 426 for each application 410. Because the application 410a is pin eligible, the user interface 437 provides a UI element for allowing the administrator to enable the pin setting 426. For instance, the user interface 437 may display a UI element 482 as a selectable element, which, when selected, displays a UI object 484 that allows the administrator to enable the pin setting 426. The UI object 484 may include a first option 486, which, when selected, causes the application 410a to be not pinned. The UI object 484 may further include a second option 488, which, when selected, causes the application 410a to be pinned to the latest version.

FIG. 5 illustrates a user interface 537 of an administrative console application according to an aspect. The user interface 537 displays (e.g., in a tab 590) the applications 510 that have been pinned (e.g., in the form of a list). For each application 510, the user interface 537 may display the name of the application 592 and the version 511 of the application. The user interface may additionally display the platform 594 for the application. Although not illustrated, in some implementations, the user interface 537 may indicate whether there is a newer version of a particular pinned application and may in some examples identify the version. As noted above, this information (whether or not there is a newer version and/or the identity of the newer version) may have been received at the administrative console application from the application store platform.

Figure 6:
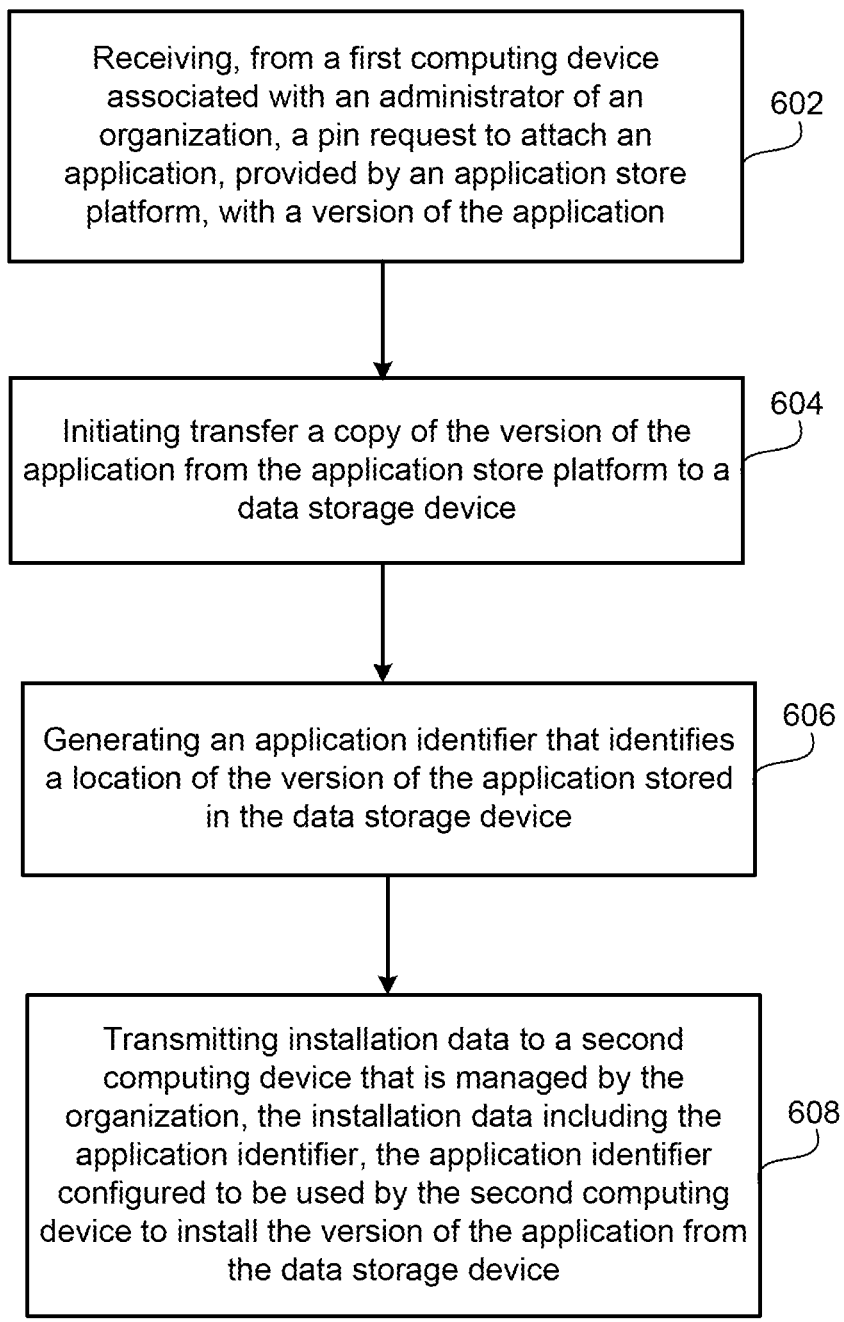
FIG. 6 illustrates a flowchart depicting example operations of a management system according to an aspect.

FIG. 6 is a flowchart 600 depicting example operations of a management system according to an aspect. Although the flowchart 600 is explained with respect to the management system 100 of FIG. 1, the flowchart 600 may be applicable to any of the embodiments discussed herein. Although the flowchart 600 of FIG. 6 illustrates the operations in sequential order, it will be appreciated that this is merely an example, and that additional or alternative operations may be included. Further, operations of FIG. 6 and related operations may be executed in a different order than that shown, or in a parallel or overlapping fashion.

The flowchart 600 includes operations enabling an administrator's computing device 132 to initiate installation of a particular version 111 (e.g., the latest version) of an application 110a (e.g., extension, web application, native application, etc.), provided by an application store platform 104, on a managed computing device 152 in which the particular version 111 is fixed (e.g., pinned) on the managed computing device 152 to control when the application 110a is updated to a newer version (e.g., auto-upgrades are not applied to a pinned version). The flowchart 600 includes operations to associate (e.g., attach, pin, or fix) an application 110a with a particular version 111 (e.g., the latest version) to prevent the application 110*a* from being upgraded (e.g., automatically upgraded) to a newer version by the application store platform 104. When an application 110 is upgraded (e.g., automatically upgraded), a device receives (from the application store platform 104) new installation data (e.g., new installation package) that contains the new version of the application 110. Once a particular version 111 is pinned by the management system 100, the application 110*a* installed on the managed computing device 152 remains as the particular version 111 until the administrator unpins the version or changes the application 110*a* to another pinned version 111. In other words, in response to a newer version of the application 110*a* becoming available on the application store platform 104, the version 111 in the data storage device 112 differs from the newer version until a subsequent pin request 101 is generated that attaches the application 110*a* to the newer version. For example, the version 111 of the application 110*a* continues to execute on the managed devices despite the newer version of the application 110*a* being available on the application store platform 104 and upgraded (e.g., automatically upgraded) on non-managed devices.

Operation 602 includes receiving, from a first computing device (e.g., computing device 132) associated with an administrator of an organization, a pin request 101 to attach an application 110*a*, provided by an application store platform 104, with a version 111 of the application 110. Operation 604 includes initiating transfer of a copy of the version 111 of the application 110*a* from the application store platform 104 to a data storage device 112. Operation 606 includes generating an application identifier 124 that identifies a location of the version 111 of the application 110*a* stored in the data storage device 112. Operation 608 includes transmitting installation data 122 to a second computing device (e.g., computing device 152) that is managed by the organization, the installation data 122 including the application identifier 124, the application identifier 124 configured to be used by the second computing device to install the version 111 of the application 110*a* from the data storage device 112.

According to some aspects, the operations include, in response to a newer version of the application becoming available on the application store platform, the version in the data storage device differs from the newer version until a subsequent pin request is generated that attaches the application to the newer version. The operations may include receiving the copy of the version of the application from the application store platform and transmitting the copy of the version of the application to the data storage device. The operations may include transmitting eligible application data to the first computing device. The eligible application data identifies that the application is pinning eligible. The eligible application data, when received, is configured to cause the first computing device to render a user interface (UI) element that, when selected, generates the pin request. In some examples, the version is a first version, and the operations include storing one or more entries of previous versions of the application in a version history database, the version history database identifying the first version and a second version and transmitting version history information to the first computing device that causes the first computing device to display information that identifies the first version and the second version as pinning candidates for selection by an administrator. The operations may include receiving, from the first computing device, an unpin request that dissociates the application with the version of the application, generating an entry in a version history database, the entry identifying the version of the application and a timestamp identifying a time associated with the unpin request, determining whether the time of the timestamp is greater than a threshold period of time, and, in response to the time of the timestamp being greater than the threshold period of time, transmitting a deletion task to the data storage device to delete the version of the application from the data storage device. The operations may include receiving, from the application store platform, upgrade information that indicates a newer version of the application is available and transmitting, to the first computing device, a notification that indicates that the newer version of the application is available.

According to an aspect, a management system may include at least one processor and a non-transitory computer-readable medium storing executable instructions that cause the at least one processor to receive, from a first computing device associated with an administrator of an organization, a pin request to attach an application, provided by an application store platform, with a version of the application, initiate transfer of a copy of the version of the application from the application store platform to a data storage device, generate installation data, the installation data including an application identifier that identifies a location of the version of the application that is stored on the data storage device, and transmit the installation data to a second computing device that is managed by the organization, the application identifier configured to be used by the second computing device to install the version of the application from the data storage device.

According to some aspects, in response to a newer version of the application becoming available on the application store platform, the version in the data storage device differs from the newer version until a subsequent pin request is generated that attaches the application to the newer version. The executable instructions include instructions that cause the at least one processor to, in response to the pin request, store a message in a queue, and select, by a queue receiver, the message from the queue such that selection of the message causes the queue receiver to retrieve the copy of the version of the application from the application store platform and transmit the copy of the version of the application to the data storage device. The executable instructions include instructions that cause the at least one processor to transmit eligible application data to the first computing device. The eligible application data identifies that the application is pinning eligible, where the eligible application data, when received, is configured to cause the first computing device to render a user interface (UI) element that, when selected, generates the pin request. The executable instructions include instructions that cause the at least one processor to, in response to the pin request, generate an entry in a version history database, the entry identifying the version of the application. In some examples, the version is a first version, and the executable instructions include instructions that cause the at least one processor to transmit, before the pin request is received, version history information to the first computing device that causes the first computing device to display information that identifies the first version and a second version of the application as pinning candidates for selection by an administrator. The executable instructions include instructions that cause the at least one processor to receive, from the first computing device, an unpin request that dissociates the application with the version of the application, generate an entry in a version history database, the entry identifying the version of the application and a timestamp identifying a time associated with the unpin request, periodically monitor the version history database to determine whether the time of the timestamp is greater than a threshold period of time, and, in response to the time of the timestamp being greater than the threshold period of time, transmit a deletion task to the data storage device to delete the version of the application from the data storage device. The application is a web application or extension executable by a browser application. The executable instructions include instructions that cause the at least one processor to receive, from the application store platform, upgrade information that indicates a newer version of the application is available, and transmit, to the first computing device, a notification that indicates that the newer version of the application is available.

According to an aspect, a non-transitory computer-readable medium storing executable instructions that cause at least one processor to execute operations. The operations include receiving, from a first computing device associated with an administrator of an organization, a pin request to attach an application, provided by an application store platform, with a version of the application, in response to the pin request, retrieving a copy of the version of the application from the application store platform, transmitting the copy of the version of the application to a data storage device, generating an application identifier that identifies a location of the version of the application stored in the data storage device, and transmitting installation data to a second computing device that is managed by the organization. The installation data includes the application identifier. The application identifier is configured to be used by the second computing device to install the version of the application from the data storage device.

According to some aspects, the operations include transmitting eligible application data to the first computing device. The eligible application data identifies that the application is pinning eligible, where the eligible application data, when received, is configured to cause the first computing device to render a user interface (UI) element that, when selected, generates the pin request. In some examples, the version is a first version, and the operations include storing one or more entries of previous versions of the application in a version history database, the version history database identifying the first version and a second version, and transmitting, before the pin request is received, version history information to the first computing device that causes the first computing device to display information that identifies the first version and the second version as pinning candidates for selection by an administrator. The operations may include receiving, from the first computing device, an unpin request that dissociates the application with the version of the application, generating an entry in a version history database, the entry identifying the version of the application and a timestamp identifying a time associated with the unpin request, determining whether the time of the timestamp is greater than a threshold period of time, and, in response to the time of the timestamp being greater than the threshold period of time, transmitting a deletion task to the data storage device to delete the version of the application from the data storage device.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, connecting lines or connectors shown in the various figures presented are intended to represent example functional relationships and/or physical or logical couplings between the various elements. Many alternative or additional functional relationships, physical connections or logical connections may be present in a practical device. Moreover, no item or component is essential to the practice of the embodiments disclosed herein unless the element is specifically described as "essential" or "critical".

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Moreover, use of terms such as up, down, top, bottom, side, end, front, back, etc. herein are used with reference to a currently considered or illustrated orientation. If they are considered with respect to another orientation, it should be understood that such terms must be correspondingly modified.

Further, in this specification and the appended claims, the singular forms "a," "an" and "the" do not exclude the plural reference unless the context clearly dictates otherwise. Moreover, conjunctions such as "and," "or," and "and/or" are inclusive unless the context clearly dictates otherwise. For example, "A and/or B" includes A alone, B alone, and A with B.

Although certain example methods, apparatuses and articles of manufacture have been described herein, the scope of coverage of this patent is not limited thereto. It is to be understood that terminology employed herein is for the purpose of describing particular aspects and is not intended to be limiting. On the contrary, this patent covers all methods, apparatus and articles of manufacture fairly falling within the scope of the claims of this patent.

What is claimed is:

1. A method for managing installation of applications, the method comprising:
   receiving a pin request to attach an application, provided by an application store platform, with a version of the application, the application store platform providing a plurality of applications for installation on a managed device and a non-managed device, the managed device being a user device that is at least partially controlled by an organization, the non-managed device being a user device that is not controlled by the organization;
   in response to the pin request, initiating transfer of a copy of the version of the application from the application store platform to a data storage device;
   generating an application identifier that identifies a location of the version of the application stored in the data storage device;
   transmitting installation data to the managed device, the installation data including the application identifier, the application identifier configured to be used by the managed device to install the version of the application from the data storage device;
   receiving an unpin request that dissociates the application with the version of the application; and
   initiating deletion of the version of the application from the data storage device.

2. The method of claim 1, further comprising:
   in response to a newer version of the application becoming available on the application store platform, not updating the version of the application at the data storage device to the newer version.

3. The method of claim 1, wherein initiating the transfer includes:
   receiving the copy of the version of the application from the application store platform; and
   transmitting the copy of the version of the application to the data storage device.

4. The method of claim 1, wherein the managed device is a first managed device, the method further comprising:
   transmitting eligible application data to a second managed device associated with an administrator of the organization, the eligible application data identifying that the application is pinning eligible,
   wherein the eligible application data, when received, is configured to cause the second managed device to render a user interface (UI) element that, when selected, generates the pin request.

5. The method of claim 1, wherein the managed device is a first managed device, wherein the version is a first version, the method further comprising:
   storing one or more entries of previous versions of the application in a version history database, the version history database identifying the first version and a second version; and
   transmitting version history information to a second managed device associated with an administrator of the organization that causes the second managed device to display information that identifies the first version and the second version as pinning candidates for selection by the administrator of the organization.

6. The method of claim 1, further comprising:
   in response to the unpin request, generating an entry in a version history database, the entry identifying the version of the application and a timestamp identifying a time associated with the unpin request;
   determining whether the time of the timestamp is greater than a threshold period of time; and
   in response to the time of the timestamp being greater than the threshold period of time, determining to transmit a deletion task to the data storage device to delete the version of the application from the data storage device.

7. The method of claim 1, wherein the managed device is a first managed device, the method further comprising:
   receiving, from the application store platform, upgrade information that indicates a newer version of the application is available; and
   transmitting, to a second managed device associated with an administrator of the organization, a notification that indicates that the newer version of the application is available.

8. A management system comprising:
   at least one processor; and
   a non-transitory computer-readable medium storing executable instructions that cause the at least one processor to:
   receive a pin request to attach an application, provided by an application store platform, with a version of the application, the application store platform providing a plurality of applications for installation on a managed device and a non-managed device, the managed device being a user device that is at least partially controlled by an organization, the non-managed device being a user device that is not controlled by the organization;

in response to the pin request, initiate transfer of a copy of the version of the application from the application store platform to a data storage device;

generate installation data, the installation data including an application identifier that identifies a location of the version of the application that is stored on the data storage device;

transmit the installation data to the managed device, the application identifier configured to be used by the managed device to install the version of the application from the data storage device;

receive an unpin request that dissociates the application with the version of the application; and initiate deletion of the version of the application from the data storage device.

9. The management system of claim 8,
in response to a newer version of the application becoming available on the application store platform, not updating the version of the application in the data storage device to the newer version.

10. The management system of claim 8, wherein the executable instructions include instructions that cause the at least one processor to:
in response to the pin request, store a message in a queue; and
select, by a queue receiver, the message from the queue such that selection of the message causes the queue receiver to retrieve the copy of the version of the application from the application store platform and transmit the copy of the version of the application to the data storage device.

11. The management system of claim 8, wherein the managed device is a first managed device, wherein the executable instructions include instructions that cause the at least one processor to:
transmit eligible application data to a second managed device associated with an administrator of the organization, the eligible application data identifying that the application is pinning eligible, wherein the eligible application data, when received, is configured to cause the second managed device to render a user interface (UI) element that, when selected, generates the pin request.

12. The management system of claim 8, wherein the executable instructions include instructions that cause the at least one processor to:
in response to the pin request, generate an entry in a version history database, the entry identifying the version of the application.

13. The management system of claim 8, wherein the managed device is a first managed device, wherein the version is a first version, wherein the executable instructions include instructions that cause the at least one processor to:
transmit, before the pin request is received, version history information to a second managed device associated with an administrator of the organization that causes the second managed device to display information that identifies the first version and a second version of the application as pinning candidates for selection by the administrator of the organization.

14. The management system of claim 8, wherein the executable instructions include instructions that cause the at least one processor to:

in response to the unpin request, generate an entry in a version history database, the entry identifying the version of the application and a timestamp identifying a time associated with the unpin request;

periodically monitor the version history database to determine whether the time of the timestamp is greater than a threshold period of time; and in response to the time of the timestamp being greater than the threshold period of time, determine to transmit a deletion task to the data storage device to delete the version of the application from the data storage device.

15. The management system of claim 8, wherein the application is a web application or extension executable by a browser application.

16. The management system of claim 8, wherein the managed device is a first managed device, wherein the executable instructions include instructions that cause the at least one processor to:
receive, from the application store platform, upgrade information that indicates a newer version of the application is available; and
transmit, to a second managed device associated with an administrator of the organization, a notification that indicates that the newer version of the application is available.

17. A non-transitory computer-readable medium storing executable instructions that cause at least one processor to execute operations, the operations comprising:
receiving a pin request to attach an application, provided by an application store platform, with a version of the application, the application store platform providing a plurality of applications for installation on a managed device and a non-managed device, the managed device being a user device that is at least partially controlled by an organization, the non-managed device being a user device that is not controlled by the organization;
in response to the pin request, retrieving a copy of the version of the application from the application store platform;
transmitting the copy of the version of the application to a data storage device;
generating an application identifier that identifies a location of the version of the application stored in the data storage device;
transmitting installation data to the managed device, the installation data including the application identifier, the application identifier configured to be used by the managed device to install the version of the application from the data storage device;
receiving an unpin request that dissociates the application with the version of the application; and
initiating deletion of the version of the application from the data storage device.

18. The non-transitory computer-readable medium of claim 17, wherein the managed device is a first managed device, wherein the operations further comprise:
transmitting eligible application data to a second managed device associated with an administrator of the organization, the eligible application data identifying that the application is pinning eligible, wherein the eligible application data, when received, is configured to cause the second managed device to render a user interface (UI) element that, when selected, generates the pin request.

19. The non-transitory computer-readable medium of claim 17, wherein the managed device is a first managed device, wherein the version is a first version, the operations further comprising:
- storing one or more entries of previous versions of the application in a version history database, the version history database identifying the first version and a second version; and
- transmitting, before the pin request is received, version history information to a second managed device associated with an administrator of the organization that causes the second managed device to display information that identifies the first version and the second version as pinning candidates for selection by the administrator of the organization.

20. The non-transitory computer-readable medium of claim 17, wherein the operations further comprise:
- in response to the unpin request, generating an entry in a version history database, the entry identifying the version of the application and a timestamp identifying a time associated with the unpin request;
- determining whether the time of the timestamp is greater than a threshold period of time; and
- in response to the time of the timestamp being greater than the threshold period of time, determining to transmit a deletion task to the data storage device to delete the version of the application from the data storage device.

* * * * *